(12) United States Patent
Tan et al.

(10) Patent No.: US 7,285,768 B2
(45) Date of Patent: *Oct. 23, 2007

(54) COLOR PHOTODETECTOR ARRAY

(75) Inventors: Boon Keat Tan, Penang (MY); Chin Hin Oon, Penang (MY); Kean Loo Keh, Penang (MY); Sumio Shimonishi, Inagi (MY)

(73) Assignee: Avago Technologies ECBU IP (Singapore) PTE Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 10/804,272

(22) Filed: Mar. 18, 2004

(65) Prior Publication Data

US 2005/0205765 A1    Sep. 22, 2005

(51) Int. Cl.
*G01J 3/50*  (2006.01)
(52) U.S. Cl. ............... 250/226; 348/277; 348/280; 356/416; 356/419
(58) Field of Classification Search ........ 250/226, 250/205, 208.1, 214.1; 348/243, 276, 277; 356/416, 419, 406; 359/589; 257/440
See application file for complete search history.

(56) References Cited

U.S. PATENT DOCUMENTS

| | | | | | |
|---|---|---|---|---|---|
| 3,996,461 | A | * | 12/1976 | Sulzbach et al. | 250/214 R |
| 4,547,074 | A | * | 10/1985 | Hinoda et al. | 356/405 |
| 5,073,008 | A | * | 12/1991 | Terashita et al. | 359/589 |
| 5,648,653 | A | * | 7/1997 | Sakamoto et al. | 250/208.1 |

\* cited by examiner

*Primary Examiner*—Georgia Epps
*Assistant Examiner*—Stephen Yam

(57) ABSTRACT

A color sensor for measuring light from a light source and the method for fabricating the color sensor. The color sensor includes a plurality of photodetectors, a plurality of primary color filters and a trim filter. Each primary color filter includes a layer of material between the light source and a corresponding one of the photodetectors. Each primary color filter preferentially transmits light in a corresponding band of wavelengths about a characteristic wavelength. The trim filter is located between the light source and the photodetectors and includes a layer of material that preferentially attenuates light at a first trim wavelength between two of the characteristic wavelengths. In one embodiment, the trim filter further preferentially attenuates light at a second trim wavelength, the first wavelength being less than one of the characteristic wavelengths and the second wavelength being greater than that characteristic wavelength.

11 Claims, 5 Drawing Sheets

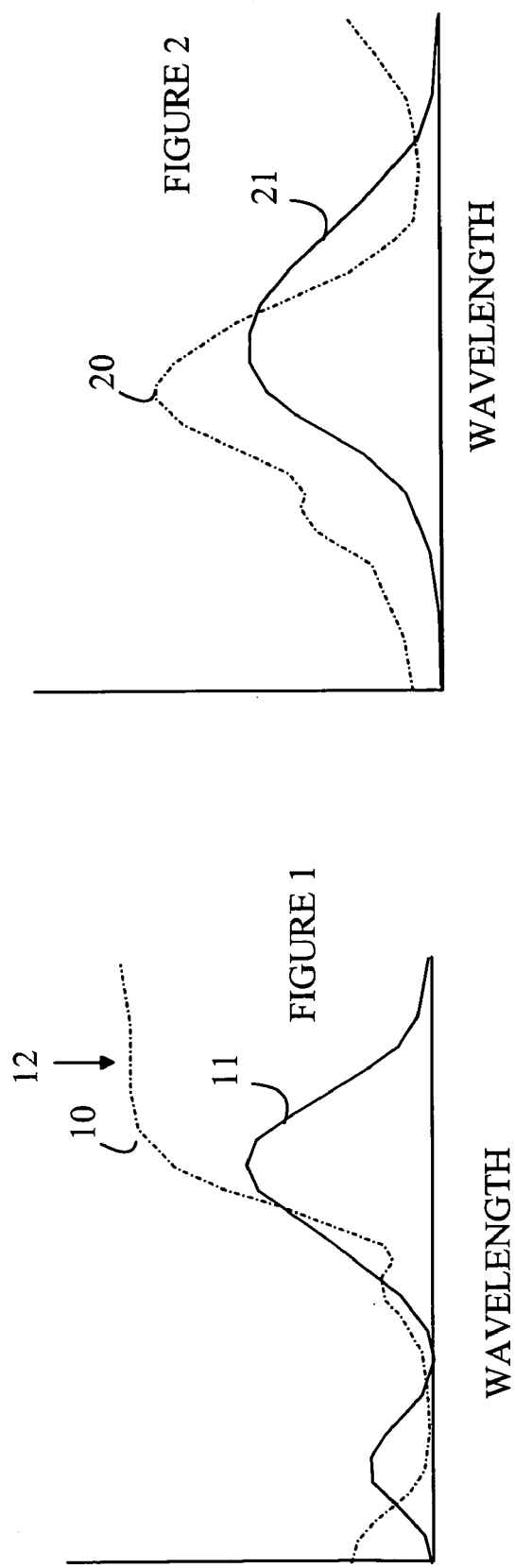
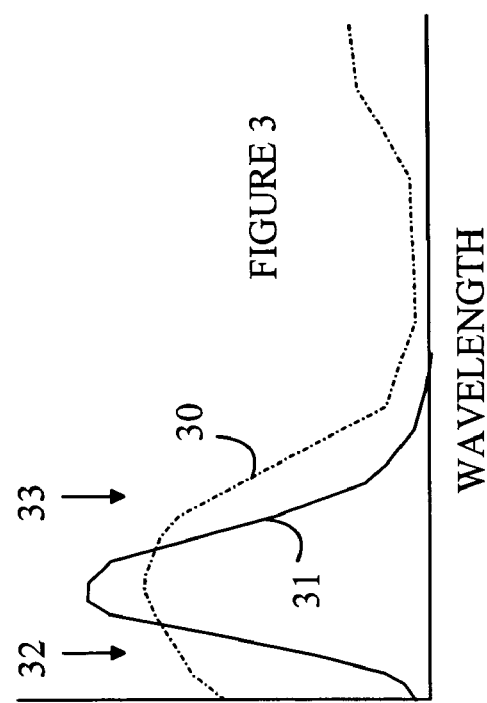

COLOR PHOTODETECTOR ARRAY

FIELD OF THE INVENTION

The present invention relates to color photodetector arrays for use in color sensor arrays and the like.

BACKGROUND OF THE INVENTION

The present invention may be more easily understood in the context of a camera that utilizes a color sensitive array of photodiodes to record an image. To provide color sensitivity, the photodiodes are typically divided into three classes of photodiodes that detect, respectively, red, green, and blue light. The various color sensitive photodiodes are dispersed over the array. For example, the detector array may consist of an array of pixels in which each pixel includes three photodiodes, one for measuring red light, one for measuring green light, and one for measuring blue light.

The color sensitive detectors are typically constructed by applying a pigment filter over a photodiode that is sensitive to light over a broad spectral range that includes red, blue, and green. For example, a color camera array can be fabricated by using conventional photolithography techniques to pattern either a red, blue, or green filter over each of the photodiodes in the array by selectively depositing the pigment in question. However, this process is limited by the materials that can be used for the pigment filter. Therefore, only limited color filter profiles can be created. For example, these filters are unable to block infrared (IR) light, and hence, such camera modules have to incorporate an additional IR blocking filter that significantly increases the costs of the camera.

In addition, the filter profiles obtained with the pigment filters do not match the standard filter profiles used to specify the color that will be perceived by a human observer at each pixel. Consider an application in which the color of a light source is to be reproduced on a printer for viewing by a human observer. While the light source may have a very complex spectrum, the eye perceives the source as having a single color that can be replicated by combining light from three colored sources. The printer is calibrated using some standardized color system such as the CIE 1931 standard. Given RGB values representing the intensity of light having the RGB spectral patterns in the standard system, the printer will produce the correct color. That is, a human observer will perceive the paper as having the same color as the light source even though the spectrum of light leaving the paper is different from that of the light.

The RGB values measured by the sensor using the pigment filters measure the intensity of light in a weighted wavelength band determined by the pigment filter transmission curve. Denote the measured intensities from the pigment filter light detectors by R'G'B'. In general, these R'G'B' values differ from the RGB values that would be obtained by an ideal filter for the standard, since filter weighting functions are different. Hence, if these pigment-based values are sent to the printer, the printer will generate a color that is different from that of the light that was input to the color sensor.

Filters having more desirable color profiles can be fabricated by using interference techniques; however, these filters are difficult to construct over small area photodiodes. Hence, these filters are not useful for color cameras and the like in which very small pixel dimensions are needed. Interference filters are constructed by depositing multiple thin film layers of transparent dielectrics of different refractive indexes. The wavelength and filter profile are set by varying the thickness and index of refraction for the dielectrics. This provides great flexibility in the filter profile design. However, this technique is not suitable for CCD camera chips since it is difficult to pattern the individual pixels for high-resolution cameras. Hence, for a camera to utilize interference filters, three separate arrays on three separate chips are required. Each chip detects an image for light of one color. The three monochrome images would then be combined to provide the final color image. Since each chip requires only one type of filter, the problems associated with fabricating small individual photodiode-sized filters are eliminated. However, the need for three separate camera chips increases the cost and complexity of the camera optical system. In addition, the intensity of light available to each chip is reduced by a factor of three, which increases the amount of light needed to make a color measurement.

SUMMARY OF THE INVENTION

The present invention includes a color sensor for measuring light from a light source and the method for fabricating the color sensor. The color sensor includes a plurality of photodetectors, a plurality of primary color filters and a trim filter. Each primary color filter includes a layer of material between the light source and a corresponding one of the photodetectors. Each primary color filter preferentially transmits light in a corresponding band of wavelengths about a characteristic wavelength. The trim filter is located between the light source and the photodetectors and includes a layer of material that preferentially attenuates light at a first trim wavelength between two of the characteristic wavelengths. In one embodiment, the trim filter further preferentially attenuates light at a second trim wavelength, the first wavelength being less than one of the characteristic wavelengths and the second wavelength being greater than that characteristic wavelength. The trim filter is an interference filter in one embodiment of the present invention. In one embodiment, the color sensor also includes a substrate having the photodetectors located therein, and the trim filter includes a trim filter layer on the substrate. The color filters are located on the trim filter layer in this embodiment. In one embodiment, the color sensor also includes a second trim filter, the second trim filter having a layer of material that preferentially attenuates light at a second wavelength that is different from each of the characteristic wavelengths and the first trim wavelength. In one embodiment, the color filters are located between the first and second trim filters.

BRIEF DESCRIPTION OF THE DRAWINGS

FIGS. 1, 2, and 3, respectively, compare the color transmission curve as a function of wavelength that is obtained with typical red, green or blue pigment filters and the color profile for the CIE 1931 standard color profile.

DETAILED DESCRIPTION OF PREFERRED EMBODIMENTS OF THE INVENTION

Figure 4:
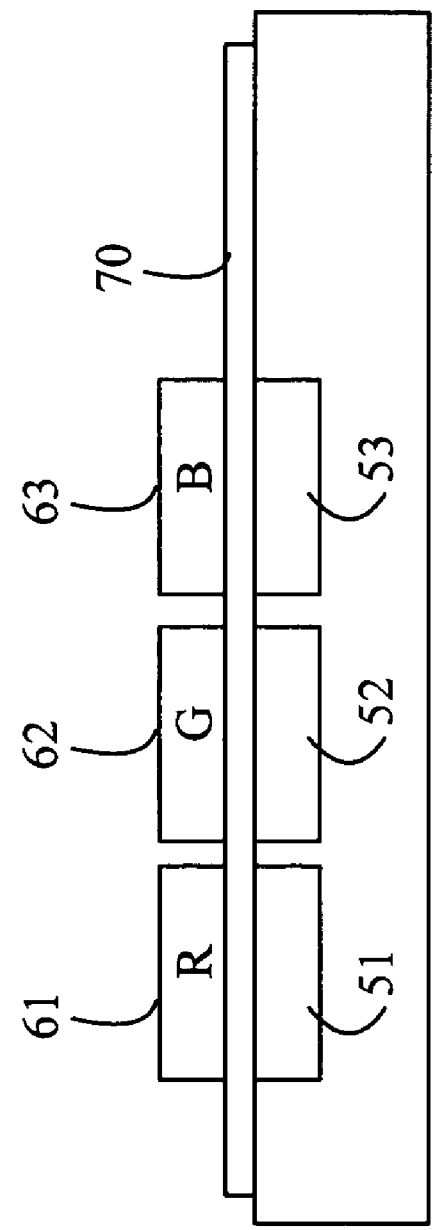
FIG. 4 is a cross-sectional view of a color sensor according to one embodiment of the present invention.

The present invention may be more easily understood with reference to a color system based on the CIE 1931 color standard. However, as will be discussed in more detail below, the principles of the present invention can be applied to other color systems. Refer now to FIG. 1, which illustrates how the color transmission curve, as a function of wavelength that is obtained with a typical red pigment filter, differs from that of the color profile for the CIE 1931 red color profile. The pigment profile is shown at 10 and the CIE 1931 standard profile is shown at 11. As can be seen from the drawing, the color profile of the pigment filter extends significantly beyond that of the CIE 1931 standard. Similarly, the color transmission curves of the typically used pigment filters for green and blue are also much broader than the corresponding filter profiles in the CIE 1931 standard as can be seen from FIGS. 2 and 3. FIG. 2 compares the color transmission curve as a function of wavelength that is obtained with a typical green pigment filter and the color profile for the CIE 1931 green color profile. The pigment profile is shown at 20, and the CIE 1931 standard profile is shown at 21. FIG. 3 compares the color transmission curve as a function of wavelength that is obtained with a typical blue pigment filter and the color profile for the CIE 1931 blue color profile. The pigment profile is shown at 30 and the CIE 1931 standard profile is shown at 31.

The present invention is based on the observation that an improved set of color filters can be obtained by combining the pigment filters described above with a second filter that selectively blocks light in the regions of the spectrum in which the pigment filters transmit more light than a filter designed to have the corresponding standard profile. Referring again to FIG. 1, it can be seen that the red pigment filter transmits more light in the region of the spectrum shown at 12 than a filter that provides the standard profile shown at 11. The present invention utilizes band-blocking filters to remove this excess transmitted light. Denote the transmission of the red pigment filter by $TPR(\lambda)$ and that of a filter providing the standard filter profile by $TSR(\lambda)$. For the purposes of this discussion, these filters will be assumed to provide the same maximum transmissions. In this case, the ideal band-blocking filter has a transmission given by $$TBR(\lambda)=TSR(\lambda)/TPR(\lambda) \quad (1)$$

Analogous band-blocking filters can be provided for the other pigment filters to tailor the resultant compound filter to be closer to that of the desired standard filter. The pigment-based filters tend to have much broader transmission curves than the more ideal standard transmission curves for the corresponding colors. For example, the locations of the bands to be blocked in the transmission curve of the blue filter are shown at 32 and 33 in FIG. 3. In general, there are one or two bands in the pigment filter transmission curves that must be attenuated to convert the pigment filter transmission curve into a transmission curve that is more nearly that of the desired transmission curve.

To simplify the following discussion, the pigment filters discussed above will be referred to as the primary filters and the band blocking filters will be referred to as trim filters. The present invention utilizes the observation that the trim filters can be combined into a single compound filter that has transmission minima at each of the bands to be blocked. The manner in which such a filter is constructed will be discussed in more detail below. For the purposes of the present discussion, it is sufficient to note that each trim filter ideally has essentially 100 percent transmission in the spectral regions that are separated from the band that is blocked by the filter. Hence, if a plurality of such filters are stacked, the transmission in the spectral regions between the blocked bands is essentially unchanged. Accordingly, a single compound filter comprising a stack of such trim filters can be placed over or under the red, blue, and green pigment filters. As a result, trim filters having physical dimensions that are much wider than a single pigment filter can be utilized, and hence, the size limitations discussed above are less critical. In fact, a single compound trim filter can be placed over or under the entire array of color sensors as a single layer that needs little if any geometric patterning.

Refer now to FIG. 4, which is a cross-sectional view of a color sensor according to one embodiment of the present invention. Color sensor 50 includes three photodetectors 51-53. Each photodetector is covered by a corresponding pigment filter. The filters corresponding to photodetectors 51-53 are shown at 61-63, respectively. A compound trim filter 70 is used to "trim" the transmission curves of the pigment filters in a manner similar to that described above. Trim filter 70 is preferably placed between the photodetectors and the pigment filters; however, embodiments in which the Trim filter is placed over the pigment filters can also be constructed.

Figure 6:
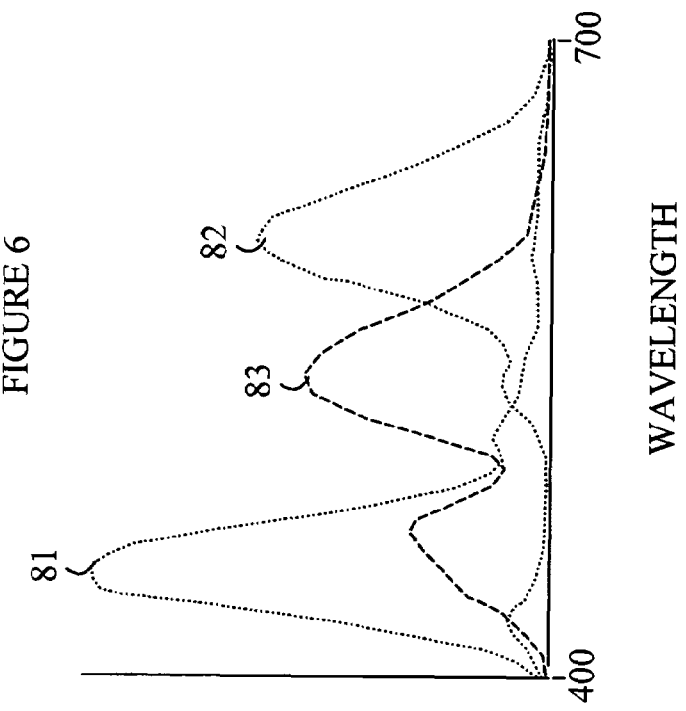
FIG. 6 illustrates the response curves for the photodiodes underlying the filters that detect red, blue and green light.
Figure 5:
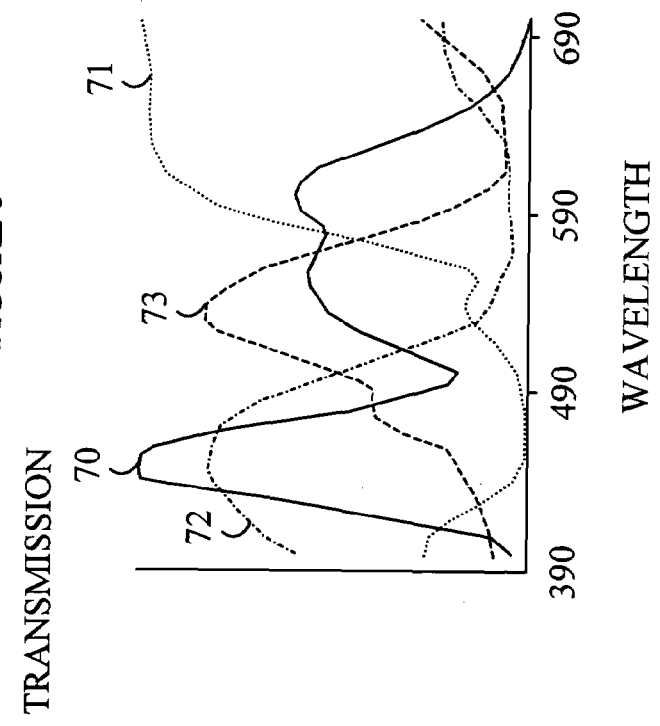
FIG. 5 illustrates the transmission curves of the pigment filters and trim filters.

The transmission curves of some typical pigment filters and trim filters are shown in FIG. 5. The normalized transmission curve for the trim filter is shown at 70, and the normalized transmission curves for the red, blue, and green pigment filters are shown at 71-73, respectively. The response curves for the photodiodes underlying the filters that detect red, blue and green light are shown at 81-83, respectively in FIG. 6. For the purposes of this discussion, a pigment filter will be defined to be any filter that alters the color spectrum of light passing therethrough by preferentially absorbing light of a particular wavelength to induce a transition between two atomic or molecular energy states in the filter material. Pigment filters that can be patterned using conventional lithography are available from Fuji Films.

The manner in which the trim filter is constructed will now be discussed in more detail. The preferred band-blocking filter is an interference filter constructed from a plurality of transparent layers of a uniform thickness in which adjacent layers have different indices of refraction. This type of filter is well known in the art, and hence, will not be discussed in detail here. For the purposes of this discussion, it is sufficient to note that a stack of such layers will block light of a wavelength determined by the thickness and indices of refraction of the layers. Light of other wavelengths is not blocked, and hence, passes through the layer stack with little attenuation. Hence, a number of such filters can be stacked to provide a compound filter that blocks light at each wavelength in a predetermined set of wavelengths while transmitting light at wavelengths that are not in the predetermined set.

Figure 7:
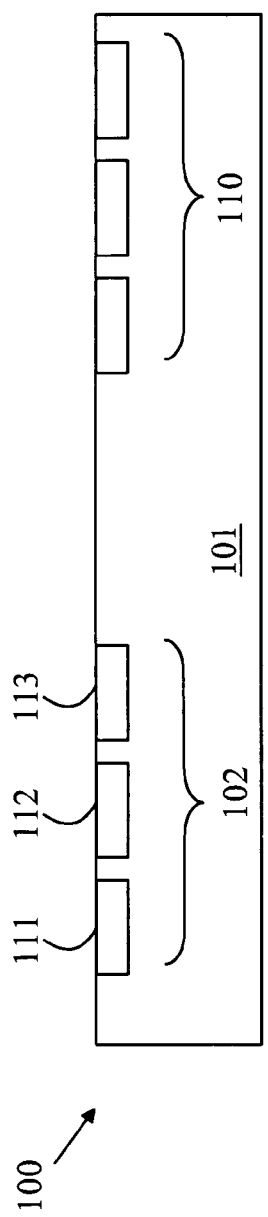
FIGS. 7-9 are cross-sectional views through a portion of a color sensor array 100 according to another embodiment of the present invention at various stages in the fabrication process.
Figure 8:
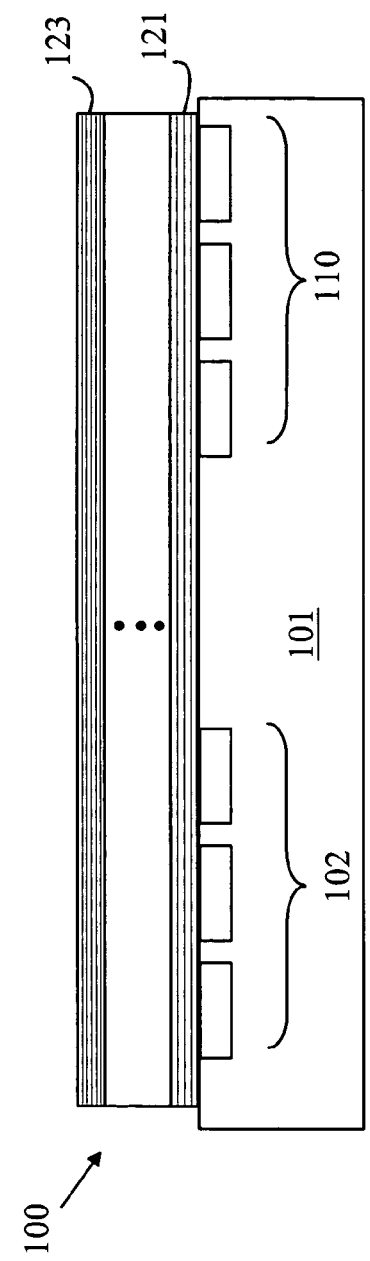
Figure 9:
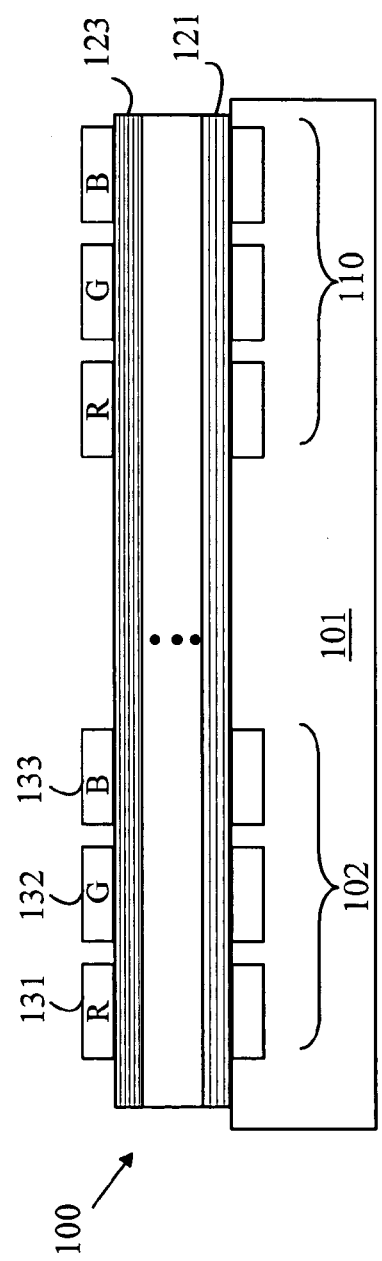

Refer now to FIGS. 7-9, which are cross-sectional views through a portion of a color sensor array 100 according to another embodiment of the present invention at various stages in the fabrication process. Referring to FIG. 7, the process starts with a substrate 101 having a plurality of photodiodes constructed therein. Exemplary sets of photodiodes are shown 102 and 110. Each set of photodiodes includes 3 separate photodiodes as shown at 111-113.

Referring now to FIG. 8, substrate 101 is placed in a deposition chamber and the various layers in the compound interference filter are deposited on the surface of the substrate. Since interference filters are known to the art, the details of the construction of the filters will not be discussed in detail here. The layers corresponding to two of the bands to be blocked are shown at 121 and 123. It should be noted that the substrate does not need to be removed from the growth chamber during the deposition process, as the various layer compositions and thickness can be controlled by adjusting the precursor compositions and deposition times used for each layer. Hence, the process is both economical and has a high yield.

Referring now to FIG. 9, the pigment filters are then deposited on top of the band-blocking filter layer using conventional photolithographic techniques. In this embodiment, pigment filters that transmit in the red, blue, and green regions of the spectrum are utilized. Exemplary pigment filters are shown at 131-133.

The above-described embodiments of the present invention utilize pigment filters to provide the primary color filtration function and interference filters to adjust the edges of the pigment filter transmission curve to more nearly match a target transmission function. However, the present invention is not limited to this particular combination of filter types. In the more general case, any filter material that can be satisfactorily patterned can be utilized in place of the pigment filter. For example, pigment filters that utilize a colored photoresist may be used. Similarly, any form of band blocking filter that can be constructed over one or more of the pigment filters can be utilized to alter the transmission curve of the pigment filter to more nearly match a target filter function. For example, band-pass filters based on other pigments can be utilized if the pigments do not have absorption bands that interfere with the operation of areas that utilize a different pigment.

Figure 10:
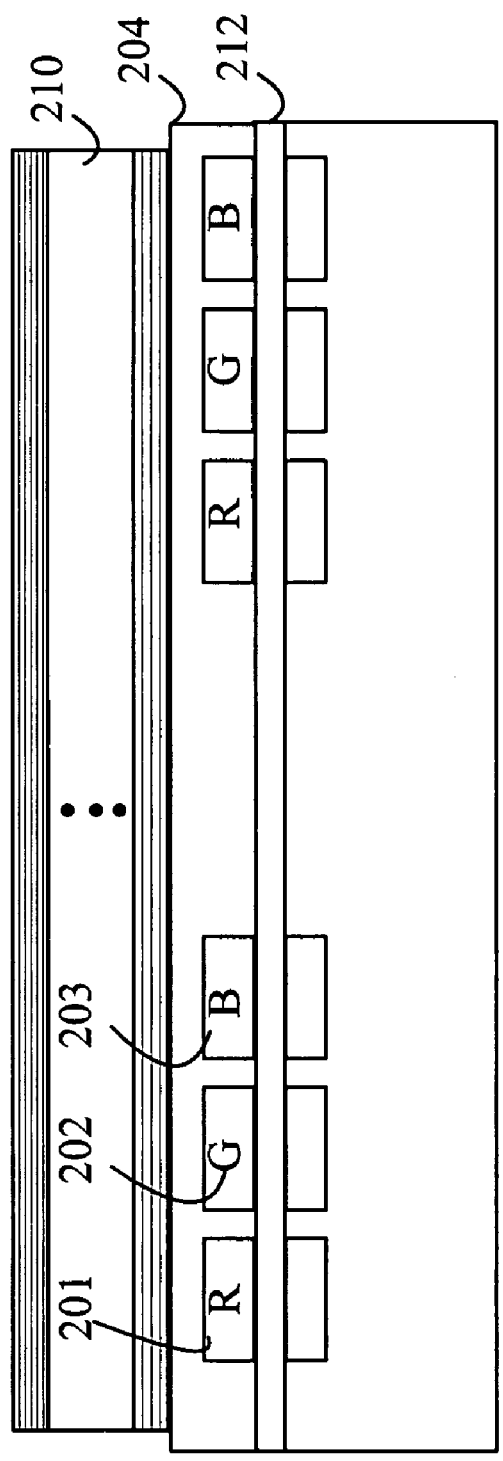
FIG. 10 is a cross-sectional view of another embodiment of a color sensor according to the present invention.

Refer now to FIG. 10, which is a cross-sectional view of another embodiment of a color sensor according to the present invention. While the above-described embodiments utilize trim filters that are deposited before the pigment filters, embodiments in which the trim filter is placed over the pigment filter can also be constructed. When the trim filters are constructed from a material requiring deposition conditions that would damage the pigment filters, and the trim filters are to be deposited over the photodetectors, the trim filters must be applied first. However, embodiments in which the trim filter is constructed separately and then bonded or mounted over the pigment filters can also be constructed. Color sensor array 200 utilizes a trim filter layer 210 that is located over the pigment filters 201-203 by applying a buffer layer 204 over the pigment filters and then bonding trim filter layer 210 to the buffer layer.

In addition, trim filter arrangements in which a portion of the trim filters is applied under the pigment filters and a second portion is applied over the pigment filters can also be advantageously used in certain circumstances. For example, the trim filter that removes the infrared may be useful in a number of different pigment filter arrangements. Hence, this filter could be incorporated over the photodiodes to provide a new starting substrate that can be used to construct a number of different color sensor arrays based on different pigment filters and/or trim filters. Such an underlying filter is shown at 212 in FIG. 10.

While the ideal trim filter described above in Eq. (1) is preferred, other less ideal trim filters can be utilized and still provide significant advantages. In general, the present invention will provide an advantage if the combination of the trim and pigment filters is more nearly matched to the target filter function than the transmission curve of the pigment alone.

The above-described embodiments of the present invention have been described in terms of the CIE 1931 standard filters. However, the principles of the present invention can be applied to fabricate color sensor arrays for use with other filter standards. Furthermore, the number of pigment filters in the color sensor is not limited to three.

As noted above, the ideal trim filter utilizes a band-blocking filter that does not absorb light having wavelengths between the blocked bands. However, it should be noted that some absorption can be tolerated in these regions. If the transmission curve of the trim filter between the blocked bands is substantially constant, any absorption can be corrected by adjusting the gain of the photodetector associated with the color sensor in quest.

The above-described embodiments of the present invention utilize photodiodes for the photodetectors. However, any form of photodetector that produces a signal related to the light intensity incident thereon can be utilized. For example, the photodiodes discussed above can be replaced by phototransistors and CCD.

Various modifications to the present invention will become apparent to those skilled in the art from the foregoing description and accompanying drawings. Accordingly, the present invention is to be limited solely by the scope of the following claims.

What is claimed is:

1. A color sensor, said color sensor comprising:
 a plurality of photodetectors;
 a plurality of primary color filters, each primary color filter comprising a layer of material overlying a corresponding one of said photodetectors, each primary color filter transmitting light in a corresponding band of wavelengths about a characteristic wavelength, that primary filter transmitting more light at said characteristic wavelength than that primary color filter transmits at a wavelength outside of said band of wavelengths; and
 a first trim filter overlying all of said photodetectors, said first trim filter comprising a layer of material that attenuates light at a first trim wavelength more than said first trim filter attenuates light at each of two of said characteristic wavelengths, wherein said first trim wavelength is between said two of said characteristic wavelengths.

2. The color sensor of claim 1 where said first trim filter further attenuates light at a second trim wavelength, said first trim wavelength being less than one of said characteristic wavelengths and said second trim wavelength being greater than that characteristic wavelength.

3. The color sensor of claim 1 further comprising a substrate having said photodetectors located therein, said first trim filter comprising a first trim filter layer on said substrate.

4. The color sensor of claim 3 wherein said color filters are located on said first trim filter layer.

5. The color sensor of claim 1 wherein said color filters are located between said first trim filter and said phobodebectors.

6. The color sensor of claim 1 further comprising a second trim filter, said second trim filter comprising a layer of material that attenuates light at a second wavelength that is different from each of said characteristic wavelengths and said first trim wavelength.

7. The color sensor of claim 6 wherein said color filters are located between said first and second trim filters.

8. A method for fabricating a color sensor that provides signals indicative of the color of light from a light source, said method comprising:

provmg a substrate having a plurality of photodetectors;

bonding a first trim filter layer to said substrate such that said first trim filter layer covers all of said photodetectors;

bonding a color filter layer to said first trim filter layer, said color filter layer comprising a plurality of primary color filters, each primary color filter comprising a layer of material between said light source and a corresponding one of said photodetectors, each primary color filter transmitting light in a corresponding band of wavelengths about a characteristic wavelength, that primary filter transmitting more light at said characteristic wavelength than that primary color filter transmits at a wavelength outside of said band of wavelengths, wherein said first trim filter comprises a layer of material that attenuates light at a first trim wavelength more than said first trim filter attenuates light at each of two of said characteristic wavelengths, wherein said first trim wavelength is between said two of said characteristic wavelengths.

9. The method of claim 8 where said first trim filter layer further attenuates light at a second trim wavelength, said first trim wavelength being less than one of said characteristic wavelengths and said second trim wavelength being greater than that characteristic wavelength said first trim filter layer attenuating light at said second trim wavelength more than said first trim filter layer attenuates light at each of that characteristic wavelength.

10. The method of claim 8 wherein said first trim filter layer comprises a plurality of transparent layers in which adjacent layers have different indices of refraction.

11. The method of claim 8 further comprising bonding a second trim filter layer to said color filter layer such that said color filter layer is between said first and second trim filter layers.

* * * * *